(12) United States Patent
Tanaka

(10) Patent No.: US 8,572,988 B2
(45) Date of Patent: Nov. 5, 2013

(54) COLD TRAP AND VACUUM EVACUATION APPARATUS

(75) Inventor: Hidekazu Tanaka, Tokyo (JP)

(73) Assignee: Sumitomo Heavy Industries, Ltd., Tokyo (JP)

(*) Notice: Subject to any disclaimer, the term of this patent is extended or adjusted under 35 U.S.C. 154(b) by 203 days.

(21) Appl. No.: 13/064,268

(22) Filed: Mar. 15, 2011

(65) Prior Publication Data

US 2011/0225989 A1 Sep. 22, 2011

(30) Foreign Application Priority Data

Feb. 19, 2010 (JP) ................................. 2010-035043

(51) Int. Cl.
*B01D 8/00* (2006.01)

(52) U.S. Cl.
USPC ......................................................... 62/55.5

(58) Field of Classification Search
USPC ........................... 62/50.6, 55.5, 440, 457.9, 6
See application file for complete search history.

(56) References Cited

U.S. PATENT DOCUMENTS 5,585,195 A 12/1996 Shimada
7,523,618 B2 * 4/2009 Tanaka ........................... 62/55.5

FOREIGN PATENT DOCUMENTS

| JP | 60-008481 A | 1/1985 |
|---|---|---|
| JP | 60-027790 A | 2/1985 |
| JP | 1-215591 A | 8/1989 |
| JP | 05-65874 A | 3/1993 |
| JP | 06-029439 A | 2/1994 |
| JP | 06-092052 A | 4/1994 |
| JP | 10-183400 A | 7/1998 |
| JP | 2005-256771 A | 9/2005 |
| JP | 2006-063898 A | 3/2006 |
| JP | 2006-103343 A | 4/2006 |
| JP | 2006-307274 A | 11/2006 |
| JP | 2008-130299 A | 6/2008 |
| JP | 2008-218064 A | 9/2008 |
| WO | WO-00-77398 A1 | 12/2000 |

OTHER PUBLICATIONS

Office Action in Korean Patent Application No. 10-2011-0039883, dated Aug. 31, 2012.
International Preliminary Report on Patentability in PCT application No. PCT/JP2010/000944, dated Jun. 12, 2012.
Office Action issued in Japanese Application No. 2010-035043, dated May 21, 2013.

* cited by examiner

*Primary Examiner* — Melvin Jones
(74) *Attorney, Agent, or Firm* — Rader, Fishman & Grauer PLLC

(57) ABSTRACT

A cold trap includes a refrigerator and a cold panel that is thermally connected with the refrigerator to be cooled. A rough surface is formed on the cold panel. The cold trap is arranged, for example, in an evacuation channel for connecting a vacuum chamber with a turbo-molecular pump in order to freeze and capture, on a surface thereof, part of a gas that is to be sucked and pumped into the turbo-molecular pump from the vacuum chamber through the evacuation channel.

5 Claims, 5 Drawing Sheets

COLD TRAP AND VACUUM EVACUATION APPARATUS

BACKGROUND

1. Technical Field

The present invention relates to a cryopump, a cold trap, and a vacuum evacuation apparatus.

2. Description of Related Art

A cryopump is a vacuum pump that captures and pumps gas molecules by condensing or adsorbing molecules on a cryopanel cooled to an extremely low temperature. A cryopump is generally used to achieve a clean vacuum environment required in a semiconductor circuit manufacturing process.

For example, Japanese Patent Application Publication No. S60-8481 describes a cryopump in which a thin film made of a fluorine-based resin or another resin is formed on the outer surfaces of the baffle and other member to be housed in the pump case of the cryopump.

In a vacuum process, there are sometimes the cases where supply of a process gas to a vacuum chamber and stop of the supply thereof are repeated. For example, in sputtering, a thin film is typically formed on a substrate by supplying a process gas at a preset flow rate and for a preset period of time. After the sputtering process is ended, the supply of a process gas is stopped to carry out supplementary works, such as exchange of the processed substrate for a new substrate to be processed. It is considered to be necessary that the vacuum degree of a vacuum chamber is recovered to a desired one for preparing the start of the next sputtering process. It is preferable that the period of time necessary for the recovery is as short as possible in terms of improvement of a throughput.

SUMMARY

According to an aspect of the present invention, a to cold trap including: a refrigerator; and a cold panel that is thermally connected with the refrigerator to be cooled, is provided, wherein a rough surface is formed on the cold panel.

According to another aspect of the present invention, a vacuum evacuation apparatus including: a vacuum pump; and a cold trap that is arranged in an evacuation channel for connecting a volume to be evacuated with the vacuum pump and that freezes and captures, on a surface thereof, at least part of a gas that is to be sucked and pumped into the vacuum pump from the volume to be evacuated through the evacuation channel, is provided, wherein the cold trap includes a clod panel exposedly arranged in the evacuation channel and a refrigerator that is thermally connected with the cold panel to cool the cold panel, and wherein a rough surface is formed on the cold panel.

BRIEF DESCRIPTION OF THE DRAWINGS

Embodiments will now be described, by way of example only, with reference to the accompanying drawing, which are meant to be exemplary, not limiting, in which.

DETAILED DESCRIPTION

Figure 1:
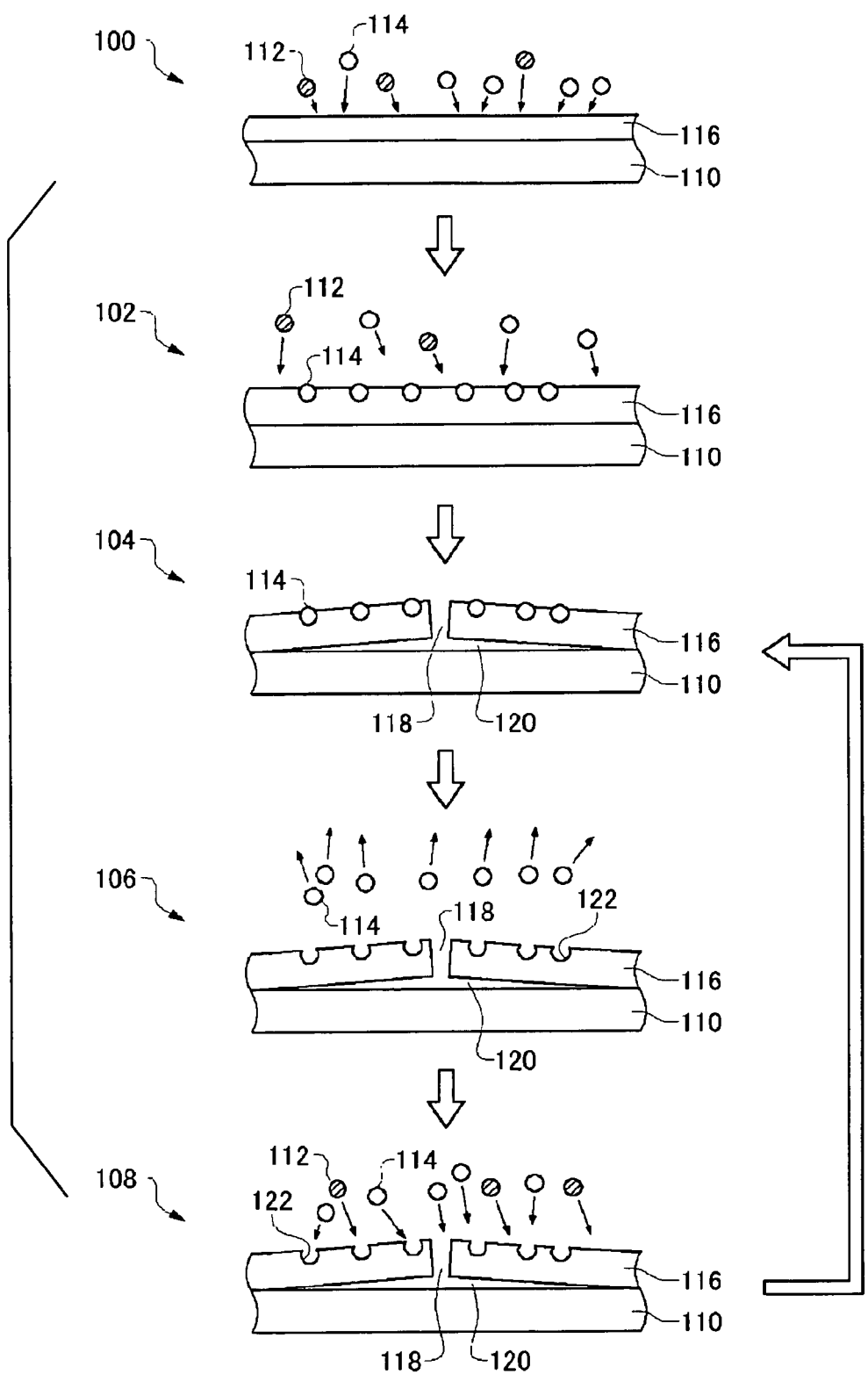
FIG. 1 is a view illustrating in principle detachment of an ice layer on the surface of a cryopanel and the influence thereof.

The invention will now be described by reference to the preferred embodiments. This does not intend to limit the scope of the present invention, but to exemplify the invention.

It is desirable to provide a cryopump, a cold trap, and a vacuum evacuation apparatus, which are capable of recovering the vacuum degree of a volume to be evacuated to a desired one for a short period of time.

A cold trap according to an embodiment of the present invention includes: a refrigerator; and a cold panel that is thermally connected with the refrigerator to be cooled. A rough surface is formed on the cold panel.

According to the embodiment, the adhesion with a condensed ice layer can be enhanced by having a rough surface on the cold panel. Thereby, detachment of the ice layer can be suppressed. Accordingly, a local rise in the temperature of the detached area due to failing to cool the area can be suppressed, to which leads to suppression of the rerelease of the gas molecules adsorbed by the ice layer in the detached area due to a cryotrapping phenomenon. Therefore, an increase in the period of time necessary for the recovery to a desired vacuum degree can be suppressed.

Another embodiment of the present invention is a vacuum evacuation apparatus. This apparatus includes: a vacuum pump; and a cold trap that is arranged in an evacuation channel for connecting a volume to be evacuated with the vacuum pump and that captures at least part of a gas, which is to be sucked and pumped into the vacuum pump from the volume to be evacuated through the evacuation channel, by freezing the part of the gas on the surface of the cold trap. The cold trap includes a cold panel exposedly arranged in the evacuation channel and a refrigerator that is thermally connected with the cold panel to cool it. A rough surface is formed on the cold panel.

A cryopump according to an embodiment of the present invention includes a cryopanel on which a rough surface is formed in the opening of a radiation shield. The cryopanel is, for example, a baffle. The rough surface is formed by, for example, performing matte plating on the substrate of the baffle. Alternatively, the rough surface may be formed by roughening the surface of the baffle along with or instead of the matte plating. The roughening treatment may be, for example, a blast treatment.

The present inventor has found that, when the supply of a process gas has been stopped in a typical cryopump, the recovery time necessary for the recovery to a desired vacuum degree becomes longer as an adsorption amount of the gas into the pump is larger. In addition, the inventor has found that the recovery time is increased stepwise every time when an ice layer is locally detached on the surface of the baffle. It can be considered that the detachment of an ice layer may be caused by the high flatness of the surface of the baffle in a typical cryopump. Because the adhesion between the accumulated ice layer and the surface of the baffle is low, the ice layer is likely to be detached from the baffle due to the internal stress that becomes larger as the ice layer becomes thicker. Because the contact area between the ice layer and the baffle becomes smaller due to the detachment, the temperature of the ice layer rises. As a result, the process gas molecules adsorbed by the ice layer due to a cryotrapping phenomenon are likely to be rereleased.

In a typical cryopump, bright nickel plating is performed on the surface of a baffle. Accordingly, the flatness thereof is high. The bright plating is performed on the baffle to reduce the radiant heat entering the inside of the radiation shield of the cryopump.

Unlike this technical thought, the inventor of the present application provides a cryopump in which an increase in the recovery time to a desired vacuum degree can be suppressed by forming a rough surface on the surface of a first stage cryopanel. The adhesion with an ice layer can be enhanced by roughening the surface of the panel. An ice layer is adhered to the surface of to the panel by a so-called anchor effect. Accordingly, an ice layer is hardly detached therefrom, which can suppress the rerelease of process gas molecules. Therefore, an increase in the recovery time to a desired vacuum degree can be suppressed.

FIG. 1 is a view illustrating in principle detachment of an ice layer on the surface of a cryopanel and the influence thereof. The reason why the recovery time to a desired vacuum degree will become longer as a result of the detachment of an ice layer will be described in detail with reference to FIG. 1. The actions of gas molecules 112 and 114 onto an ice layer 116, occurring when supply of a process gas and stop of the supply thereof are repeated, are schematically illustrated in FIG. 1.

In FIG. 1, a white circle with diagonal lines illustrates the water molecule 112 and a white circle illustrates the process gas molecule 114. The water molecule 112 is moisture vapor contained in the atmosphere. The process gas 114 is usually a gas condensed at a lower temperature than water. A first stage cryopanel 110 is cooled to a temperature between the condensation temperature of moisture and that of the process gas. Accordingly, the water molecule 112 is mainly condensed on the cryopanel 110 to form an ice layer 116.

A cryopump is in operation through the illustrated states 100 to 108. The states 100 and 102 illustrate ones when the process gas is being supplied, and the states 104 and 106 illustrate ones when the supply of the gas is stopped. The state 108 illustrates one when the process gas is being supplied next time. In a vacuum chamber, a process is performed while the process gas is being supplied. Recovery processing is performed during the stop of the supply of the process gas, in which the vacuum chamber is evacuated to a desired vacuum degree required at the start of the next process. Accordingly, in the process states 100 and 102, vacuum states with a relatively high pressure are generated, and in the recovery states 104 and 106, vacuum states with a low pressure are generated.

For example, sputtering processing is performed in the vacuum process; however, another film-forming processing using a process gas may be performed. In the sputtering processing, a process gas for electrical discharge is generally introduced into a chamber of vacuum atmosphere to generate plasma due to glow discharge by applying a voltage between electrodes, so that a thin film is formed on the surface of a substrate heated to a predetermined temperature on the positive electrode by hitting the surface of a target on the negative electrode with the positive ions in the plasma. The process gas molecules may only act on the target molecules physically, or may chemically react with the target molecules to form a thin film made of the reactant on the surface of the substrate. The process gas contains, for example, argon gas. The process gas may further contain nitrogen gas or oxygen gas.

In the state 100 of FIG. 1, the water molecule 112 and the process gas molecule 114 in the atmosphere fly from the vacuum chamber to the ice layer 116 on the cryopanel 110. The water molecule 112 contained in the atmosphere is derived from the previous recovery processing or maintenance processing of the vacuum chamber. The open air around the vacuum chamber enters the chamber when the chamber is opened for exchange of the substrate or maintenance. There is the possibility that the open air may not be completely dry and moisture may be contained. It can also be considered that the moisture adsorbed on the surface of the installed substrate may be released in the vacuum chamber.

As illustrated in the state 102, the water molecule 112 that has flown there accumulates on the ice layer 116, thereby increasing the thickness of the ice layer 116. Along with the phenomenon, the process gas molecule 114 is adsorbed on the surface of the ice layer 116 by a cryotrapping phenomenon. The cryotrapping phenomenon means one in which, on a gas molecule layer condensed on a cryopanel, another gas molecules, which are condensed at a lower temperature than the aforementioned gas, are captured by adsorption. It is known as a cryotrapping phenomenon that, in the case of a mixed gas of argon and hydrogen, hydrogen molecules are captured by an argon condensed layer. Also, in the case of a mixed gas of moisture and a process gas (e.g., argon gas), it can be considered that a cryotrapping phenomenon may occur likewise. Accordingly, the process gas 114, which is not intrinsically condensed on the surface of the cryopanel 110 at the cooling temperature thereof, is adsorbed and captured by the ice layer 116 on the cryopanel 110 due to a cryotrapping phenomenon.

When the process is ended, it is transferred to the recovery state 104. The process gas molecule 114 adsorbed due to a cryotrapping phenomenon is captured by the ice layer 116. When the thickness of the ice layer 116 becomes large, a crack 118 and detachment 120 are locally generated in the ice layer 116. It can be considered that they are generated due to an increase in the internal stress of the ice layer 116. For convenience of description, it has been assumed that the crack 118 and detachment 120 are generated in the recovery state 104; however, it should be understood that both of them are also generated during the process due to an increase in the thickness of the ice layer 116.

When the detachment 120 is generated on the ice layer 116, a gap between the ice layer 116 and the cryopanel 110 is generated by the ice layer 116 being apart from the cryopanel 110 in the detached area. That is, the ice layer 116 is not in contact with the cryopanel 110. Accordingly, the temperature of the ice layer 116 in the detached area is increased because the cooling by the cryopanel 110 becomes insufficient. Different from during the process, the process gas 114 is not supplied in the recovery states 104 and 106, and hence the atmospheric pressure becomes low. As a result, the process gas 114 adsorbed by the ice layer 116 is rereleased, as illustrated in the state 106. Many holes 122 are formed in the ice layer 116 from which the process gas 114 has been rereleased. That is, many holes 122 are formed in the detached are of the ice layer 116 by the rerelease of the process gas 114 during the recovery.

The vacuum degree becomes decreased due to the rereleased process gas 114. Return to a desired vacuum degree needs the re-adsorption of the process gas 114 onto an undetached area of the ice layer 116, or the condensation of the process gas 114 onto a second cryopanel (not illustrated) cooled to a lower temperature than the cryopanel 110. Accordingly, when the ice layer 116 is detached from the surface of the cryopanel 110, the recovery time to a desired vacuum degree becomes longer.

As illustrated in the state 108, next process is started when the vacuum degree has reached one at which the start of the process is allowed. Similarly to the states 100 and 102, the water molecule 112 that has flown there accumulates on the ice layer 116 and the process gas molecule 114 is adsorbed by the holes 122 in the ice layer 116 and the surfaces around them due to a cryotrapping phenomenon. In the further following recover state, the process gas 114 is likewise rereleased from the detached area of the ice layer 116.

Thus, the adsorption of the process gas due to a cryotrapping phenomenon and the rerelease thereof during the recovery are repeated. It can be considered that the rerelease of the process gas 114 may adversely affect a swift recovery to a high vacuum degree. As the adsorption amount of the gas pumped by the cryopump becomes larger, the thickness of the ice layer 116 becomes larger, and thereby the detached areas locally dispersed spread over the whole surface area of the baffle. Accordingly, the amount of the rereleased process gas becomes to larger, and there is the fear in the worst case that it becomes difficult to recover to a desired vacuum degree within an allowed period of time.

Figure 2:
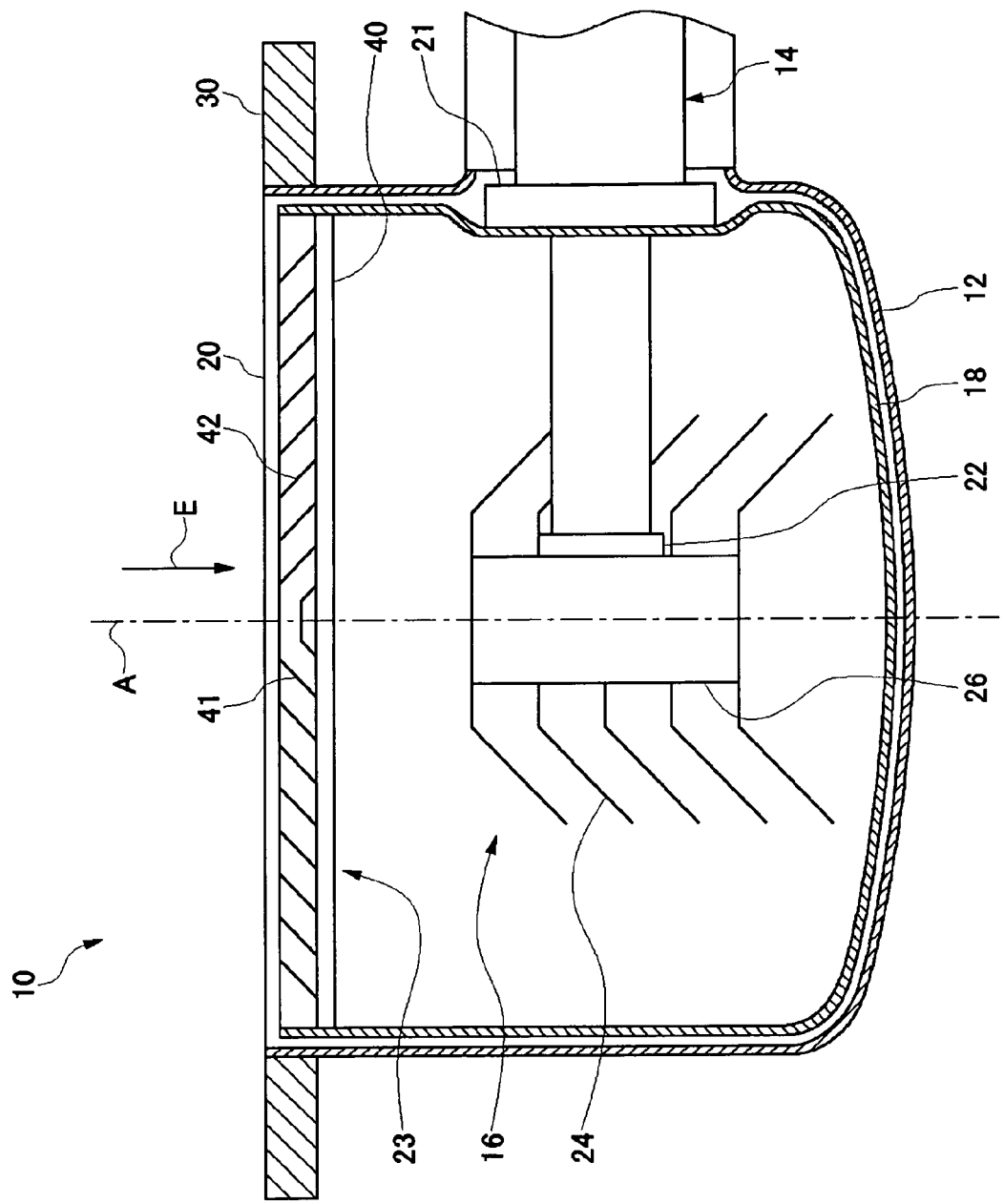
FIG. 2 is a view schematically illustrating part of a cryopanel according to an embodiment of the present invention.

FIG. 2 is a view schematically illustrating part of a cryopump 10 according to an embodiment of the present invention. The cryopump 10 is installed in a vacuum chamber in, for example, an ion implantation apparatus, sputtering apparatus, or the like, to be used for increasing the vacuum degree of the inside of the vacuum chamber to a level required in a desired process.

The cryopump 10 is formed to include a pump case 12, a refrigerator 14, a cryopanel structure 16, and a radiation shield 18. The cryopump 10 illustrated in FIG. 2 is a so-called horizontal-type cryopump. The horizontal-type cryopump 10 generally means the cryopump 10 in which a second cooling stage 22 of the refrigerator 14 is arranged to be inserted within the tubular radiation shield 18 along the direction crossing the central axis direction of the radiation shield 18 (usually along the direction crossing at right angles). Further, the present invention can also be applied to a so-called vertical-type cryopump likewise. The vertical-type cryopump means one in which the refrigerator 14 is arranged to be inserted along the central axis of the radiation shield 18.

The cryopump 10 includes a first cryopanel cooled to a first cooling temperature level and a second cryopanel cooled to a second cooling temperature level lower than the first cooling temperature level. The gas whose vapor pressure is low at the first cooling temperature level is captured on the first cryopanel by condensation and then pumped. The gas whose vapor pressure is lower than, for example, a reference vapor pressure (e.g., $10^{-8}$ Pa) is pumped. The gas whose vapor pressure is low at the second cooling temperature level is captured on the second cryopanel by condensation and then pumped. An adsorption area is formed on the surface of the second cryopanel in order to capture a non-condensable gas that is not condensed even at the second temperature level because of its high vapor pressure. The adsorption area is formed by providing an adsorbent on the surface of the panel. The non-condensable gas is adsorbed in the adsorption area cooled to the second temperature level and then pumped. The first cryopanel includes, for example, the radiation shield 18 and a louver 23 and the second cryopanel includes, for example, the cryopanel structure 16.

FIG. 2 schematically illustrates the section formed by the plane including both the central axis A of the pump case 12 and the radiation shield 18 and that of the refrigerator 14. In FIG. 2, the direction of gas entry from the vacuum chamber, which is a volume to be evacuated outside the pump, to the inside of the cryopump is denoted with the arrow E. The direction E of gas entry should be understood as the direction from the outside toward the inside of the cryopump. It is only for easy understanding of description for convenience that, in the view, the direction E of gas entry is to be parallel with the central axis A of the radiation shield 18. In the cryopumping process, the actual direction of gas molecule entry into the inside of the cryopump is not naturally the same as the illustrated direction E of gas entry in a strict sense, but rather it is common that the direction crosses the direction E of gas entry.

The pump case 12 has a portion formed into a cylindrical shape whose one end has an opening and the other end is covered. The cryopanel structure 16 and the radiation shield 18 are arranged inside the pump case 12. The opening of the pump case 12 is provided as an inlet through which a gas to be pumped enters and is defined by the inner surface at the upper end portion of the tubular side surface of the pump case 12. A fitting flange 30 extends toward the radial outside at the upper end portion of the pump case 12. The cryopump 10 is installed in the vacuum chamber in an ion implantation apparatus, etc., which is a volume to be evacuated, by using the fitting flange 30. In addition, the shape of the section perpendicular to the central axis A of the pump case 12 is not limited to a circle, but may be another shape, such as an ellipse or polygon.

The refrigerator 14 is, for example, a Gifford-McMahon refrigerator (so-called GM refrigerator). The refrigerator 14 is a two-stage refrigerator including the first cooling stage 21 and the second cooing stage 22. The second cooling stage 22 is surrounded by the pump case 12 and the radiation shield 18 and arranged at the center of the internal space formed by them. The first cooling stage 21 is cooled to the first cooling temperature level and the second cooling stage is cooled to the second cooling temperature level lower than the first cooling temperature level. The second cooling stage 22 is cooled to, for example, approximately 10 K to 20 K, and the first cooling stage 21 is cooled to, for example, approximately 80 K to 100 K.

The cryopanel structure 16 is fixed in a state thermally connected with the second cooling stage 22 of the refrigerator 14 to be cooled to almost the same temperature as that of the second cooling stage 22. The cryopanel structure 16 includes a plurality of cryopanels 24 and a connection member 26. Each of the plurality of cryopanels 24 has, for example, a shape of the side surface of a truncated cone, so to speak, an umbrella-like shape. Alternatively, the cryopanel 24 may have another appropriate shape. Each panel 24 is usually provided with an adsorbent (not illustrated), such as activated carbon. The adsorbent is adhered to, for example, the back surface of the panel 24. The connection member 26 is provided as a member for thermally connecting the cryopanel structure 16 with the second cooling stage 22 and for mechanically supporting the structure 16. The connection member 26 is fixed to the second cooling stage 22 of the refrigerator 14 and the plurality of cryopanels 24 are attached to the connection member 26. Both the cryopanels 24 and the connection member 26 are formed of a material, for example, such as copper. Or, they may be formed of copper that is used as a substrate and the surface thereof is plated with nickel. Alternatively, the cryopanels 24, etc., may be formed of aluminum instead of copper. When a thermal conductivity is considered to be important, copper can be used; while weight saving and furthermore shortening of the recovery time are considered to be important, aluminum can be used.

The radiation shield 18 is fixed in a state thermally connected with the first cooling stage 21 of the refrigerator 14 and cooled to almost the same temperature as that of the first cooling stage 21. The radiation shield 18 is provided as a radiation shield for protecting the cryopanel structure 16 and the second cooling stage 22 from the surrounding radiant heat. Similarly to the pump case 12, the radiation shield 18 is also formed into a cylindrical shape whose one end has an shield opening 20 and the other end is covered. The radiation shield 18 is formed into a cup shape. Both the pump case 12 and the radiation shield 18 are formed into an approximate circle shape and arranged concentrically with each other. The inner diameter of the pump case 12 is slightly larger than the outer diameter of the radiation shield 18, so that the radiation shield 18 is arranged in a non-contact state with the pump case 18 with a slight gap with the inner surface of the pump case 18. In the example illustrated in FIG. 1, the covered portion of the radiation shield 18 is formed to be curved in a dome shape so as to be away from the shield opening 20 toward the central axis A. The covered portion of the pump case 12 is also formed to be likewise curved in a dome shape.

The second cooling stage 22 of the refrigerator 14 is arranged at the center of the internal space of the radiation shield 18. The refrigerator 14 is inserted from the opening of the side surface of the radiation shield 18 and the first cooling stage 21 is attached to the opening. Thus, the second cooling stage 22 of the refrigerator 14 is arranged in the middle between the shield opening 20 and the deepest portion on the central axis of the radiation shield 18.

The shape of the radiation shield 18 is not limited to a cylindrical shape, but may be a tubular shape having any section, such as a rectangular cylinder or elliptic cylinder. The shape of the radiation shield 18 is typically made to have a shape similar to the internal shape of the pump case 12. Alternatively, the radiation shield 18 may not be formed into an integrated tubular shape as illustrated, but formed to have a tubular shape as a whole by a plurality of parts. The plurality of parts may be arranged so as to be spaced apart from each other.

The louver 23 is arranged in the opening 20 of the radiation shield 18. The louver 23 functions as a baffle. That is, the louver 23 captures a gas condensed at a relatively high temperature, such as moisture, to suppress entry of the gas into the radiation shield, and also suppress incidence of the radiant heat.

The louver 23 is arranged concentrically with the radiation shield 18. The louver 23 is provided to be spaced apart from the cryopanel structure 16 in the central axis direction of the radiation shield 18. The louver 23 is provided over the whole shield opening 20. Alternatively, the louver 23 may be arranged so as to substantially have an offset from the opening 20 of the to radiation shield 18 (e.g., at a position inside the shield from the shield opening 20). Even in the case, the louver 23 is provided to occupy a section perpendicular to the central axis A of the radiation shield 18. In addition, a gate valve (not illustrated) may be provided between the louver 23 and the vacuum chamber. The gat valve is set, for example, to be closed when the cryopump 10 is regenerated and to be opened when the vacuum chamber is evacuated by the cryopump 10.

The louver 23 is attached to the radiation shield 18 with a louver fitting portion 40. The louver fitting portion 40 has a plurality of arm portions each extending in the radial direction when viewed from the direction of the central axis A. For example, when having four arm portions, the louver fitting portion 40 has a cross shape when viewed from the central axis. The end of each arm portion extending in the radial direction of the louver fitting portion 40 is attached to the inner surface near to the opening of the radiation shield 18. When having a cross shape, the louver fitting portion 40 is attached to the radiation shield 18 at four positions, for example, at intervals of 90 degrees. The louver fitting portion 40 mechanically fixes the louver 23 to the radiation shield 18 and thermally connects both of them. Thereby, the louver fitting portion 40 also functions as a heat transfer path from the radiation shield 18 to the louver 23, so that the louver 23 is cooled to almost the same temperature as that of the radiation shield 18.

The louver 23 is formed of a plurality of louver boards 41, each of which is formed into a shape of the side surface of a truncated cone having a diameter different from others and is arranged concentrically with others. Alternatively, the louver 23 may be formed into another shape, such as a lattice shape. Each louver board 41 is attached to the louver fitting portion 40 in a manner that slopes at the same angle as others (e.g., 45 degrees) with respect to the surface of the opening 20.

The space of each louver board 41 is adjusted such that, when viewed in the central axis direction from outside the pump, the inside of the pump (e.g., cryopanel 24) cannot be seen from the space thereof due to the overlap of the adjacent louver boards 41. That is, the space of each louver board 41 is adjusted such that, of the adjacent two louver boards 41, the outer circumferential end of the louver board 41 located inside is positioned inside the radial direction than the inner circumferential end of the louver board 41 located outside. Accordingly, the louver 23 has no open area when viewed in the central axis direction such that the internal space of the radiations shield 18 is covered, so to speak, optically.

Alternatively, the louver 23 may be formed such that the internal space of the radiation shield 18 is optically opened. For example, an annular open area may be formed between the adjacent louver boards 41 in the peripheral area of the louver 23. Alternatively, an annular open area may be formed by not providing the louver board 41 in the peripheral area near to the side wall of the radiation shield 18. In this case, the area and position of the open area are set such that the pumping speed of the cryopump 10 (e.g., pumping speed of a process gas) achieves required specifications.

Of the surfaces of the louver 23, a rough surface 42 is formed on the surface facing outside the radiation shield 18. The rough surface means one on which minute concavities and convexities, which cannot be recognized by human eyes, are formed. The front surface of each louver board 41 has a predetermined surface roughness. The surface roughness of the rough surface 42 can be appropriately set empirically or experimentally, taking into consideration the adhesion with the ice layer. The rough surface 42 is formed by matte nickel plating. The minute concavities and convexities are formed by the crystal growth in the matte plating process.

Alternatively, it may be made that, of the surfaces of the louver 23, a rough surface is formed in a portion where an ice layer may accumulate relatively thickly and a smooth surface is formed in a portion where an ice layer may accumulate relatively thinly without forming a rough surface. For example, it may be made that a rough surface is formed on the surface of the louver board in the central area of the louver 23 and a smooth surface is formed on the surface of the louver board in the peripheral area thereof.

Alternatively, it may be made that, of the surfaces of the louver 23, a rough surface 42 is also formed on the back surface facing inside the radiation shield 18. Alternatively, a rough surface may be formed on at least one of the inner surface and the outer surface of the radiation shield 18.

The roughening treatment for forming the rough surface 42 is not limited to the matte plating treatment performed on the baffle substrate. The roughening treatment may be any treatment for enhancing the anchor effect on the surface of the baffle, for example, such as a blast treatment of the baffle substrate (e.g., a glass bead blast treatment or so-called GBB treatment) and etching treatment, etc. Alternatively, the roughening treatment may be performed on the surface after a plating treatment has been performed on the baffle substrate (i.e., the surface of a plating layer) instead of performing on the surface of the baffle substrate. For example, a matte treatment for eliminating the gloss of a bright-plating layer may be performed as a roughening treatment after the bright-plating has been performed on the baffle substrate. Thus, the rough surface 42 has a surface roughness within a predetermined range that is determined in accordance with the adopted roughening treatment.

Operations of the cryopump 10 with the aforementioned configuration will be described below. In operating the cryopump 10, the inside of the vacuum chamber is first roughed to approximately 1 Pa by using another appropriate roughing pump before the operation thereof. Thereafter, the cryopump 10 is operated. By driving the refrigerator 14, the first and the second cooling stages 21 and 22 are cooled, thereby the radiation shield 18, the louver 23, and the cryopanel 24, which are thermally connected thereto, also being cooled.

The cooled louver 23 cools the gas molecules flowing from the vacuum chamber toward the inside of the cryopump 10, such that a gas (e.g., moisture) whose vapor pressure is sufficiently low at the cooling temperature is condensed on the surface of the louver 23 and then pumped. A gas whose vapor pressure is not sufficiently low at the cooling temperature of the louver 23 enters the radiation shield 18 through the louver 23. Of the entered gas molecules, a gas whose vapor pressure is sufficiently low at the cooling temperature of the cryopanel 24 is condensed on the surface of the cryopanel 24 and then pumped. A gas (e.g., hydrogen) whose vapor pressure is not sufficiently low at the cooling temperature is adsorbed by an adsorbent that is adhered to the surface of the cryopanel 24 to be cooled, and then pumped. Thus, the cryopump 10 can increase the vacuum degree of the vacuum chamber to a desired level.

Figure 3:
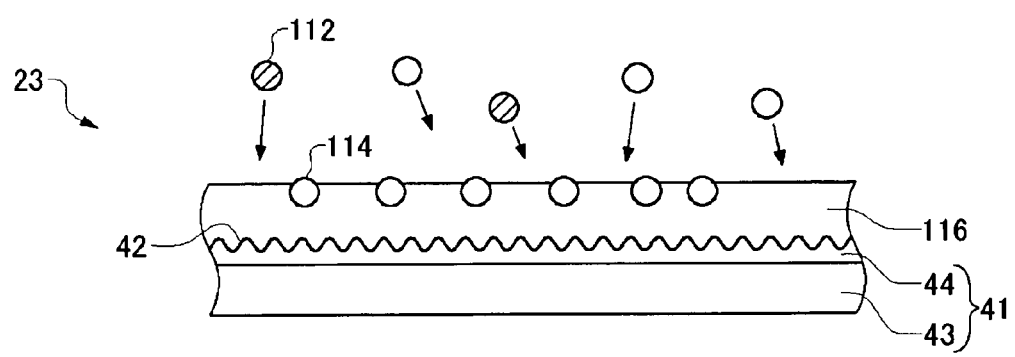
FIG. 3 is an enlarged view schematically illustrating the section of a louver according to an embodiment of the invention, during an evacuation operation.

FIG. 3 is an enlarged view schematically illustrating the section of the louver 23 during an evacuation operation. As stated above, the louver board 41 of the louver 23 according to an embodiment has a matte plating layer 44 on the surface of a substrate 43. The material of the substrate 43 is, for example, copper and the matte plating layer is formed of, for example, nickel. The surface of the matte plating layer 44 is the rough surface 42 having minute concavities and convexities. The minute concavities and convexities that form the rough surface 42 has a surface roughness within a predetermined range that is determined in accordance with the selected matte plating treatment. Accordingly, the ice layer 116 is adhered to the louver board 41 by an anchor effect of the rough surface 42. Accordingly, the rerelease of the process gas molecule 114 can be suppressed, and therefore an increase in the recovery time to a desired vacuum degree can be suppressed.

In the present embodiment, the surface of the baffle is dared to be roughened, different from a typical cryopump. Thereby, it becomes difficult that the ice layer may be detached, and hence the rerelease of the process gas molecules adsorbed by a cryotrapping phenomenon can be suppressed. Accordingly, it becomes possible to recover the vacuum chamber to a desired vacuum degree in a short period of time. Further, a secondary advantage can be obtained in which the reflectance of the surface of the baffle is increased by the formation of an ice layer adhered to the surface of the louver board 41, thereby allowing for the adsorption of the incident radiant heat to be reduced. Thereby, the influence of radiant heat, occurring when the surface of the baffle is roughened, can be alleviated.

In a preferred embodiment, the rough surface 42 may have a fractal-like double structure. That is, the rough surface 42 may be formed as follows: on a first rough surface having a relatively large surface roughness, a second rough surface having a surface roughness smaller than the first rough surface is formed. In this case, when the surface of the cryopanel is viewed macroscopically, the surface area per unit area is made large by the minute concavities and convexities of the second rough surface. Accordingly, the anchor effect on the surface of the panel can be further enhanced, thereby allowing for an ice layer to be strongly adhered to the surface thereof.

Figure 4:
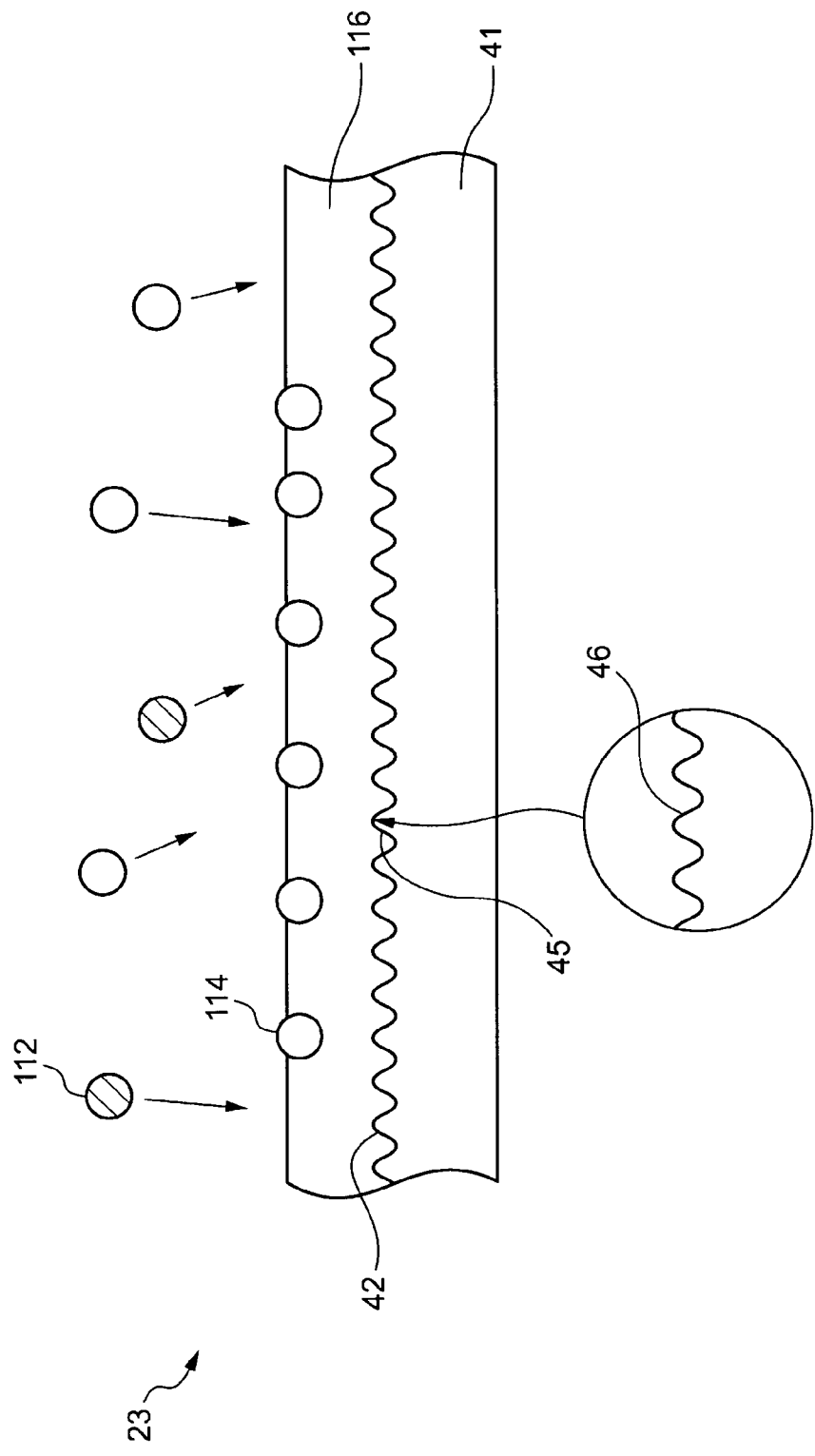
FIG. 4 is an enlarged view schematically illustrating the section of a louver according to another example of the invention, during an evacuation operation.

FIG. 4 is an enlarged view schematically illustrating the section of the louver 23 according to another example, during an evacuation operation. A first concave-convex structure 45 is formed on the surface of the louver board 41 of the louver 23. A second concave-convex structure 46 more minute than the first concave-convex structure 45 is formed on the surface of the first concave-convex structure 45. Many concavities and convexities of the second concave-convex structure 46 are formed on the surface of each concave or each convex of the first concave-convex structure 45. That is, the rough surface 42 has a surface structure in which, when the surface roughness thereof is measured at a low magnification, a first surface roughness is obtained, and when it is measured at a high magnification, a second surface roughness more minute than the first surface roughness is obtained. For convenience, it is illustrated in the view, that the concavities and convexities are regularly arranged; however, the arrangement thereof should not be limited thereto, but may be arranged irregularly.

It is preferable that the center-line average roughness Ra of the first concave-convex structure 45 is within a range of several μm to several tens μm and that of the second concave-convex structure 46 is within a range of several nm to to several tens nm. Specifically, it is preferable that the center-line average roughness Ra of the first concave-convex structure 45 is within a range of 0.5 μm to 100 μm and that of the second concave-convex structure 46 is within a range of 1 nm to 400 nm. It is more preferable that the center-line average roughness Ra of the first concave-convex structure 45 is within a range of 0.5 μm to 20 μm and that of the second concave-convex structure 46 is within a range of 10 nm to 100 nm.

It is preferable that the first concave-convex structure 45 is formed by performing a first roughening treatment on the baffle substrate and the second concave-convex structure 46 is formed by performing a second roughening treatment after the first roughening treatment. The first roughening treatment may be a machining treatment. The second roughening treatment may be a chemical treatment. A roughening treatment by a machining process may be, for example, the aforementioned blast treatment. A roughening treatment by a chemical treatment may be, for example, the aforementioned matte plating treatment.

Figure 5:
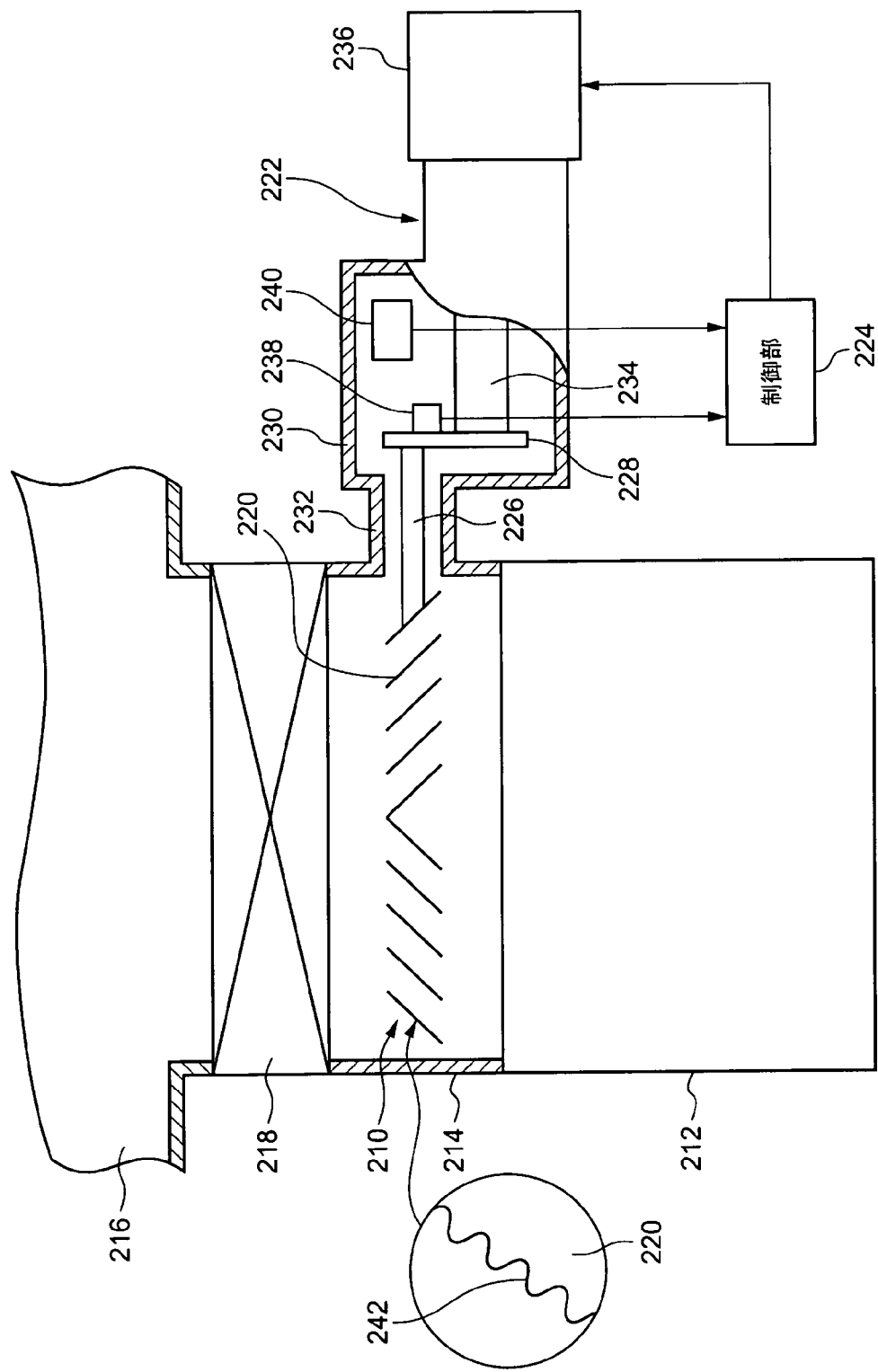
FIG. 5 is a view schematically illustrating a vacuum evacuation system according to an embodiment of the invention.

FIG. 5 is a view schematically illustrating a vacuum evacuation system according to an embodiment of the present invention. The vacuum evacuation system includes a cold trap 210 and a vacuum pump (e.g., a turbo-molecular pump 212). The vacuum pump is a high vacuum pump for evacuating to a high vacuum region. The turbo-molecular pump 212 is connected with a vacuum chamber 216 in a vacuum processing apparatus through an evacuation channel to 214. The cold trap 210 is arranged on the near side of the turbo-molecular pump 212 in the evacuation channel 214. The cold trap 210 is an in-line type cold trap. The cold trap 210 is arranged at a position vertically above the turbo-molecular pump 212. Alternatively, the vacuum pump may be a diffusion pump. The vacuum evacuation system may further include an auxiliary pump for roughing the vacuum chamber 216, in addition to a high vacuum pump.

Further, a gate valve 218 for isolating the vacuum evacuation system from the vacuum chamber 216 is provided in the evacuation channel 214. The gate valve 218 is provided between the opening of the vacuum chamber 216 and the cold trap 210. The vacuum evacuation system is communicated by opening the gate valve 218 such that the vacuum chamber 216 is evacuated, and is isolated from the vacuum chamber 216 by closing the gate valve 218. In regenerating the cold trap 210, the gate valve 218 is typically closed. Alternatively, the gate valve 218 may be configured as part of the vacuum evacuation system or provided in the opening of the vacuum chamber 216 as part of the vacuum processing apparatus.

The cold trap 210 is formed to include a cold panel 220 for capturing a gas on the surface thereof, a refrigerator 222, and a control unit 224. The whole cold panel 220 is exposed to the evacuation channel 214 to freeze and capture, on the surfaces thereof, part of a gas flowing through the evacuation channel 214 by being cooled with the refrigerator 222. The cold panels 220 is arranged along the plane perpendicular to the gas distribution direction in the evacuation channel 214 (vertical direction in FIG. 5). The projection area of the cold panel 220 with respect to the gas distribution direction is set so as to occupy, for example, most of the sectional area of the evacuation channel 214 perpendicular to the gas distribution direction.

The cold panel 220 is a louver having, for example, a plurality of metallic louver boards. Each louver board is formed into a shape of the side surface of a truncated cone having a diameter different from others and is arranged concentrically with others. Alternatively, the cold panel 220 may be formed into a chevron shape or another shape, such as a lattice shape.

The cold panel 220 is thermally connected with a cooling stage 228 of the refrigerator 222 through a rod-shaped heat transfer member 226 protruding from the outer circumferential portion of the cold panel 220. An opening is provided at a position in the evacuation channel 214 corresponding to the heat transfer member 226, and a connection housing 232, which houses the heat transfer member 226 and connects the evacuation channel 214 and a refrigerator housing 230, is attached to the opening. The internal space of the evacuation channel 214 and that of the refrigerator housing 230 are airtightly connected by the connection housing 232. Accordingly, the internal pressure of the refrigerator housing 230 becomes equal to the pressure in the evacuation channel 214.

The refrigerator 222 is a Gifford-McMahon refrigerator (so-called GM refrigerator). In addition, the refrigerator 222 is a one-stage refrigerator, and has the cooling stage 228, a cylinder 234, and a refrigerator motor 236. The cooling stage 228 is attached to one end of the cylinder 234 and the refrigerator motor 236 is provided at the other end thereof. A displacer (not illustrated) in which a regenerator material is mounted is built in the cylinder 234. The refrigerator motor 236 is connected with the displacer such that the displacer can be reciprocally moved inside the cylinder 234. The refrigerator motor 236 is also connected with a movable valve (not illustrated) provided inside the refrigerator 222 such that the valve can be rotated forward and backward.

A compressor (not illustrated) is connected with the refrigerator 222 through a high-pressure piping and a low-pressure piping. The refrigerator 222 generates a cold state in the cooling stage 228 and the cold panel 220 by repeating heat cycles in each of which a high-pressure operating gas (e.g., helium) supplied from the compressor is expanded inside and then discharged. The refrigerator motor 236 makes the movable valve rotate in a predetermined direction to achieve the heat cycle. The compressor recovers the operation gas discharged from the refrigerator 222 in order to supply to the refrigerator 222 after pressurizing the gas again. In addition, a heat cycle in which the aforementioned heat cycle is reversed is achieved by the refrigerator motor 236 making the movable valve rotate in the opposite direction, thereby allowing for the cooling stage 228 and the cold panel 220 to be heated. Alternatively, the cooling stage 228 or the cold panel 220 may be heated by using a heating means, such as a heater, etc., instead of or in conjunction with the aforementioned reverse operation of the refrigerator 222.

A temperature sensor 238 is provided in the cooling stage 228 of the refrigerator 222. The temperature sensor 238 periodically measures the temperature of the cooling stage 228 to output a signal indicating the measured temperature to the control unit 224. The temperature sensor 238 is connected with the control unit 224 such that the output thereof can be communicated. Because the cooling stage 228 and the cold panel 220 are formed integrally with each other in terms of heat, the temperature measured by the temperature sensor 238 indicates that of the cold panel 220. Alternatively, the temperature sensor 238 may be provided in the cold panel 220 or the heat transfer member 226.

A pressure sensor 240 is provided inside the refrigerator housing 230. The pressure sensor 240 periodically measures the internal pressure of the refrigerator housing 230, i.e., the pressure of the evacuation channel 214 to output a signal indicating the measured pressure to the control unit 224. The pressure sensor 240 is connected with the control unit 224 such that the output thereof can be communicated. Alternatively, it may be made that the pressure sensor 240 measures the pressure only during the regeneration processing of the cold trap 210 to output to the control unit 224. The value measured by the pressure sensor 240 indicates the pressure around the cold panel 220, i.e., the ambient pressure thereof. Alternatively, the pressure sensor 240 may be provided inside the connection housing 232 or in the evacuation channel 214.

The cold panel 220 has the same configuration as the louver 23 described with reference to FIGS. 2 to 4. Of the surfaces of the cold panel 220, a rough surface 242 is formed on the surface that faces the vacuum chamber 216. The front surface of the cold panel 220 has a predetermined surface roughness. The surface roughness of the rough surface 242 can be appropriately set empirically or experimentally, taking into consideration the adhesion with an ice layer. The rough surface 242 is formed by performing matte plating on the substrate. Minute concavities and convexities are formed by the crystal growth in the matte plating process. Or, the rough surface 242 may be formed by performing another roughing treatment described above.

The rough surface 242 may be a rough surface having a double concave-convex structure, as illustrated in FIG. 4. The cold panel 220 may have a rough surface in which, on the surface having a first surface roughness, a second surface roughness smaller than the first surface roughness is formed.

Alternatively, it may be made that, of the surfaces of the cold panel 220, a rough surface is formed in a portion where an ice layer may accumulate relatively thickly and a smooth surface is formed in a portion where an ice layer may accumulate relatively thinly without forming a rough surface. For example, it may be made that a rough surface is formed on the surface of the louver board in the central area of the cold panel 220 and a smooth surface is formed on the surface of the louver board in the peripheral area thereof. Of the surfaces of the cold panel 220, the rough surface 242 may also be formed on the back surface that faces the turbo-molecular pump 212.

In the evacuation treatment by the vacuum evacuation system illustrated in FIG. 5, the vacuum chamber 216 is evacuated by opening the gate valve 218 and operating the turbo-molecular pump 212, thereby increasing the vacuum degree thereof to a desired level. Alternatively, before the turbo-molecular pump 212 is operated, the vacuum chamber 216 may be evacuated by an auxiliary roughing pump. The cold trap 210 is cooled to the temperature (e.g., 100 K) at which the moisture flowing through the evacuation channel 214 can be captured. Typically, the moisture-pumping speed of the turbo-molecular pump 212 is relatively small; however, large moisture-pumping speed can be achieved by using in combination the cold trap 210.

In the evacuation treatment, the control unit 224 controls the refrigerator motor 236 based on the temperature measured by the temperature sensor 238 such that the temperature of the cold panel 220 is equal to a target temperature (e.g., 100 K). The control unit 224 determines the number of rotations of the refrigerator motor 236 such that, for example, the deviation between the temperature measured by the temperature sensor 238 and the target temperature is minimized. For example, the control unit 224 increases the number of rotations of the refrigerator motor 236 when the measured temperature is higher than the target temperature, while reduces the number thereof when the measured temperature is lower than the target temperature. Thus, the temperature of the cold panel 220 is maintained at the target temperature.

In the present embodiment, the detachment of an ice layer captured on the surface of the cold panel 220 can be suppressed by roughening the surface thereof. Accordingly, even if gas molecules to be pumped by a high vacuum pump in the subsequent stage (e.g., turbo-molecular pump 212) is adsorbed on an ice layer due to a cryotrapping phenomenon, the rerelease of the adsorbed gas molecules can be suppressed.

What is claimed is:

1. A cold trap comprising:
   a refrigerator; and
   a cold panel that is thermally connected with the refrigerator to be cooled,
   wherein a rough surface is formed on the cold panel,
   wherein the rough surface is formed by performing matte plating on a substrate of the cold panel.

2. A cold trap comprising:
   a refrigerator; and
   a cold panel that is thermally connected with the refrigerator to be cooled,
   wherein a rough surface is formed on the cold panel,
   wherein the rough surface is formed on a surface of the cold trap, the surface that faces a volume to be evacuated.

3. A cold trap comprising:
   a refrigerator; and
   a cold panel that is thermally connected with the refrigerator to be cooled,
   wherein a rough surface is formed on the cold panel,
   wherein the rough surface is such that a second surface roughness is formed on a surface having a first surface roughness, the second surface roughness smaller than the first surface roughness.

4. The cold trap according to claim 3, wherein the first surface roughness is formed by a machining process and the second surface roughness is formed by a chemical treatment.

5. A vacuum evacuation apparatus comprising:
   a vacuum pump; and
   a cold trap that is arranged in an evacuation channel for connecting a volume to be evacuated with the vacuum pump and that freezes and captures, on a surface thereof, at least part of a gas that is to be sucked and pumped into the vacuum pump from the volume to be evacuated through the evacuation channel,
   wherein the cold trap includes a cold panel exposedly arranged in the evacuation channel and a refrigerator that is thermally connected with the cold panel to cool the cold panel,
   wherein a rough surface is formed on the cold panel.

* * * * *